US012710390B2

(12) United States Patent
Nakamura

(10) Patent No.: US 12,710,390 B2
(45) Date of Patent: Aug. 18, 2026

(54) VOID FRACTION SENSOR, FLOWMETER USING THE SAME, AND CRYOGENIC LIQUID TRANSFER PIPE

(71) Applicant: KYOCERA Corporation, Kyoto (JP)

(72) Inventor: Katsumi Nakamura, Koka (JP)

(73) Assignee: KYOCERA Corporation, Kyoto (JP)

( * ) Notice: Subject to any disclaimer, the term of this patent is extended or adjusted under 35 U.S.C. 154(b) by 465 days.

(21) Appl. No.: 18/265,856

(22) PCT Filed: Dec. 9, 2021

(86) PCT No.: PCT/JP2021/045381

§ 371 (c)(1),
(2) Date: Jun. 7, 2023

(87) PCT Pub. No.: WO2022/124375

PCT Pub. Date: Jun. 16, 2022

(65) Prior Publication Data

US 2024/0027386 A1 Jan. 25, 2024

(30) Foreign Application Priority Data

Dec. 9, 2020 (JP) ................................ 2020-204565

(51) Int. Cl.
*G01N 27/22* (2006.01)
*G01F 1/74* (2006.01)

(52) U.S. Cl.
CPC ............ *G01N 27/226* (2013.01); *G01F 1/74* (2013.01)

(58) Field of Classification Search
CPC ........ G01N 27/226; G01N 27/22; G01F 1/74; G01F 1/56; G01F 1/86
See application file for complete search history.

(56) References Cited

U.S. PATENT DOCUMENTS

| | | | | |
|---|---|---|---|---|
| 5,543,722 A | | 8/1996 | Suzuki et al. | |
| 5,861,755 A | | 1/1999 | Moerk et al. | |
| 2014/0203824 A1 | * | 7/2014 | Nivet .................. | G01N 27/221 324/663 |

FOREIGN PATENT DOCUMENTS

| | | | | |
|---|---|---|---|---|
| CN | 108195896 A | | 6/2018 | |
| CN | 108152339 B | | 5/2020 | |
| CN | 108195896 B | * | 7/2020 | ............ G01N 27/22 |
| JP | 54072556 U | | 5/1979 | |
| JP | S63-214620 A | | 9/1988 | |
| JP | H5-52796 A | | 3/1993 | |
| JP | H7-35670 A | | 2/1995 | |
| JP | H10-282032 A | | 10/1998 | |

(Continued)

OTHER PUBLICATIONS

Maeno et al., “Void Fraction Measurement of Cryogenic Two Phase Flow Using a Capacitance Sensor”, Trans. USASS Aerospace Tech. Japan vol. 12, No. ists29, pp. Pa_101-Pa_107, 2014.

*Primary Examiner* — Timothy P Graves
(74) *Attorney, Agent, or Firm* — Procopio, Cory, Hargreaves & Savitch LLP

(57) ABSTRACT

A void fraction sensor for measuring a void fraction of a cryogenic liquid includes a pipe having a flow channel in which a cryogenic liquid flows, a first electrode and a second electrode disposed outside the flow channel, and at least one intermediate electrode disposed in the flow channel and between the first electrode and the second electrode, the at least one intermediate electrode measuring capacitance with the first electrode and/or the second electrode.

13 Claims, 4 Drawing Sheets

(56) References Cited

FOREIGN PATENT DOCUMENTS

| | | | |
|---|---|---|---|
| JP | 2014115164 | A | 6/2014 |
| JP | 2014-524566 | A | 9/2014 |
| JP | 2014-232007 | A | 12/2014 |

* cited by examiner

VOID FRACTION SENSOR, FLOWMETER USING THE SAME, AND CRYOGENIC LIQUID TRANSFER PIPE

TECHNICAL FIELD

The present disclosure relates to a void fraction sensor for measuring a void fraction of a cryogenic liquid such as liquid hydrogen, a flowmeter using the same, and a cryogenic liquid transfer pipe.

BACKGROUND OF INVENTION

With the recent trend of reducing greenhouse gas emissions, the use of hydrogen as a potent energy storage medium has been attracting attention. In particular, liquid hydrogen has a high volumetric efficiency and can be stored for a long period of time, and various techniques for utilizing liquid hydrogen have been developed. However, a method for accurately measuring the flow rate which is required in handling a large volume of liquid hydrogen for industrial use has not been established. A major reason for this is that liquid hydrogen is a fluid which is very easily vaporized and has a large fluctuation of gas-to-liquid ratio that fluctuates largely.

That is, liquid hydrogen is a liquid having an extremely low temperature (boiling point −253° C.) and having very high thermal conductivity and low latent heat, which causes immediate generation of voids. Therefore, in a transfer pipe, liquid hydrogen is in a so-called two-phase flow in which gas and liquid are mixed.

Because of the large fluctuation of the void content percentage, the flow rate of the liquid hydrogen cannot be accurately determined by only measuring the flow velocity in the pipe, as in ordinary liquids, when measuring the flow rate of the liquid hydrogen flowing in the pipe.

In view of the above, a void fraction sensor that measures a void fraction indicating a gas phase volume percentage of the gas-liquid two phase flow is under development. As such a void fraction sensor, Non-Patent Document 1 has proposed a capacitance type void fraction sensor that measures capacitance using a pair of electrodes. Non-Patent Document 1 has reported measuring the void fraction of liquid nitrogen using this void fraction sensor. A pipe used in this capacitance type void fraction sensor has a relatively small inner diameter of 10.2 mm.

CITATION LIST

Non-Patent Literature

Non-Patent Document 1: Norihide MAENO et al. (5), "Void Fraction Measurement of Cryogenic Two Phase Flow Using a Capacitance Sensor", Trans. JSASS Aerospace Tech. Japan, Vol. 12, No. ists29, pp. Pa_101-Pa_107, 2014

SUMMARY

A void fraction sensor according to the present disclosure measures a void fraction of a cryogenic liquid, and includes a pipe having a flow channel in which a cryogenic liquid flows, a first electrode and a second electrode disposed outside the flow channel, and at least one intermediate electrode disposed in the flow channel and between the first electrode and the second electrode, the at least one intermediate electrode configured to measure capacitance with the first electrode and/or the second electrode.

Another void fraction sensor according to the present disclosure includes a pipe having a flow channel in which a cryogenic liquid flows, and at least one pair of electrodes configured to measure capacitance, in which the at least one pair of electrodes includes an electrode disposed outside the flow channel and an electrode disposed in the flow channel.

Still another void fraction sensor according to the present disclosure includes a pipe having a flow channel in which a cryogenic liquid flows, and at least one pair of electrodes that measures capacitance, in which the at least one pair of electrodes is disposed in the flow channel.

A flowmeter according to the present disclosure measures a flow rate of a cryogenic liquid flowing in a flow channel of a pipe, and includes the void fraction sensor described above, and a flow velocity meter configured to measure a flow velocity of the cryogenic liquid flowing in the flow channel.

The present disclosure also provides a cryogenic liquid transfer pipe provided with the flowmeter described above.

DESCRIPTION OF EMBODIMENTS

Figure 1:
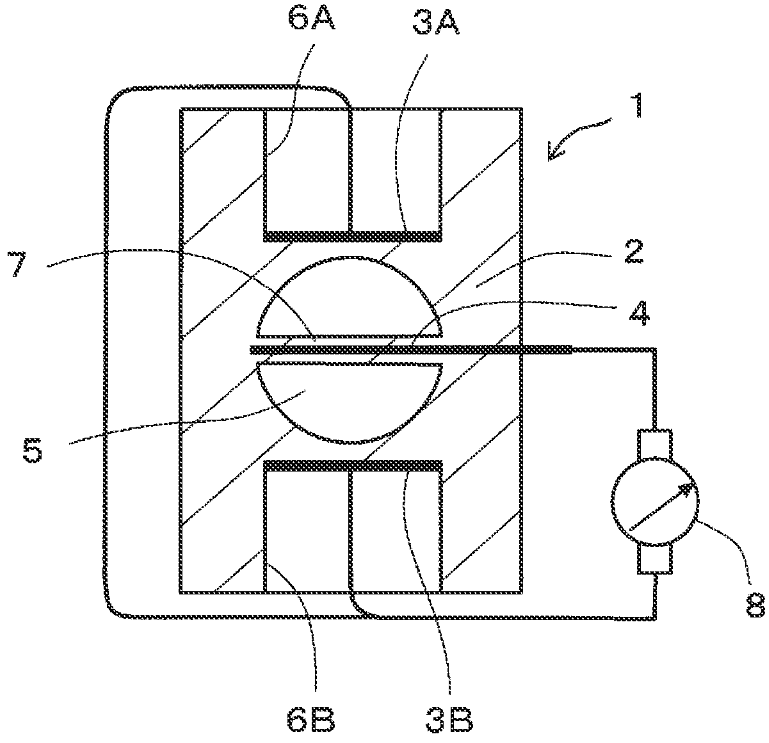
FIG. 1 is a schematic cross-sectional view illustrating a void fraction sensor according to an embodiment of the present disclosure.

Hereinafter, a void fraction sensor according to an embodiment of the present disclosure will be described. As an example, a void fraction sensor that measures a void fraction when liquid hydrogen is used as a cryogenic liquid will be described. FIG. 1 illustrates a void fraction sensor 1 according to an embodiment of the present disclosure. As illustrated in FIG. 1, the void fraction sensor 1 according to the present embodiment includes a first electrode 3A and a second electrode 3B disposed outside a flow channel 5 of a pipe 2 in which liquid hydrogen flows through the flow channel 5, and an intermediate electrode 4 disposed in the flow channel 5 of the pipe 2. The intermediate electrode 4 is disposed between the first electrode 3A and the second electrode 3B so as to face the first electrode 3A and the second electrode 3B along the axial direction of the flow channel 5 of the pipe 2 (a direction perpendicular to the surface of the paper of FIG. 1). The flow channel 5 has a circular cross section perpendicular to the axial direction across the intermediate electrode 4.

The first electrode 3A and the second electrode 3B are disposed outside the flow channel 5. The first electrode 3A and the second electrode 3B being disposed outside the flow channel 5 means that the first electrode 3A and the second electrode 3B may be located on the outer periphery of the pipe 2, as illustrated in FIG. 1, or may be located inside the pipe 2 surrounding the flow channel 5. In particular, the first electrode 3A and the second electrode 3B are disposed on the outer periphery of the pipe 2, as illustrated in FIG. 1. The first electrode 3A and the second electrode 3B disposed on the outer periphery of the pipe 2 facilitates fabrication of the void fraction sensor 1.

When there are a plurality of flow channels in one pipe 2, the plurality of flow channels are regarded as one flow channel, and the first electrode 3A and the second electrode 3B are disposed outside this group of flow channels and sandwiching this group of flow channels. When the plurality of flow channels are present in one pipe 2 as described above, the intermediate electrode 4 is located between the first electrode 3A and the second electrode 3B and between the adjacent flow channels.

With the intermediate electrode 4 disposed in the flow channel 5 of the pipe 2, the capacitance can be measured between the first electrode 3A and the intermediate electrode 4 and between the second electrode 3B and the intermediate electrode 4 even when the inner diameter of the flow channel 5 increases, thus reducing the distance between the electrodes and increasing the capacitance.

By disposing the first electrode 3A and the second electrode 3B to face each other, the area of the intermediate electrode 4 can increase, leading to an increase in the capacitance accumulated between the electrodes and improving the measurement accuracy of the void fraction of liquid hydrogen.

The first electrode 3A and the second electrode 3B and the intermediate electrode 4 are all electrically connected to the capacitance measuring device 8, and the measured capacitance values are displayed on the capacitance measuring device 8.

The pipe 2 has a tubular body in which the flow channel 5 through which liquid hydrogen flows is provided and is made of an insulating ceramic. Examples of such a ceramic include ceramics containing zirconia, alumina, sapphire, aluminum nitride, silicon nitride, sialon, cordierite, mullite, yttria, silicon carbide, cermet, or β-eucryptite as a main constituent.

The insulating ceramic refers to a ceramic having a volume resistance value of at least $10^{10}$ Ω·m at 20° C.

The main constituent of a ceramic refers to a constituent accounting for at least 60 mass % out of 100 mass % of all constituents constituting the ceramic. In particular, the main constituent may preferably be a constituent that accounts for at least 95 mass % out of 100 mass % of the constituents constituting the ceramic. The constituents constituting the ceramic may be obtained by using an X-ray diffractometer (XRD). For the content of each constituent, after the constituent is identified, the content of elements constituting the constituent is determined using a fluorescence X-ray analyzer (XRF) or an ICP emission spectrophotometer, and may be converted into the identified constituent.

The relative density of a ceramic is, for example, from 92% to 99.9%. The relative density, relative to the theoretical density of a ceramic, is expressed as a percentage (ratio) of the apparent density of a ceramic which is determined in accordance with JIS R 1634-1998.

The ceramic includes closed pores, and a value obtained by subtracting an average equivalent circle diameter of the closed pores from an average distance between the centers of gravity of adjacent closed pores may be from 8 μm to 18 μm (this value will hereinafter be referred to as the distance between the closed pores). The closed pores are independent of each other.

When the interval between the closed pores is 8 μm or greater, the closed pores are present in a relatively dispersed manner which increases mechanical strength. When the interval between the closed pores is 18 μm or less, even if a microcrack originating from the contour of a closed pore occurs due to repeated cold thermal shocks, the likelihood of the extension of the microcrack being blocked is high due to the surrounding closed pores. This means that the pipe 2 composed of this ceramic having an interval between closed pores of from 8 μm to 18 μm can be used over a long period of time.

The skewness of the equivalent circle diameter of the closed pores may be larger than the skewness of the distance between the centers of gravity of the closed pores. The skewness is an index (a statistic) indicating how much a distribution is distorted from the normal distribution. That is, the skewness indicates the bilateral symmetry of the distribution. When the skewness is greater than 0, the tail of the distribution extends to the right. When the skewness is 0, the distribution is bilaterally symmetrical. When the skewness is less than 0, the tail of the distribution extends to the left.

Overlapping histograms of the equivalent circle diameter and the distance between the centers of gravity of the closed pores indicates that the mode value of the equivalent circle diameter is located on the left side (zero side) of the mode value of the distance between the centers of gravity of the closed pores, when the skewness of the equivalent circle diameter is larger than the skewness of the distance between the centers of gravity. This means that many closed pores with small equivalent circle diameters are present and such closed pores are present sparsely, such that the pipe 2 having both mechanical strength and thermal shock resistance can be obtained.

For example, the skewness of the equivalent circle diameter of the closed pores is 1 or greater, and the skewness of the distance between the centers of gravity of the closed pores is 0.6 or less. The difference between the skewness of the equivalent circle diameter of the closed pores and the skewness of the distance between the centers of gravity of the closed pores is 0.4 or greater.

To determine the distance between the centers of gravity and the equivalent circle diameter of the closed pores, the ceramic composing the pipe is polished on a copper disc using diamond abrasive grains having an average grain diameter $D_{50}$ of 3 μm from one end surface of the pipe along the axial direction. Subsequently, polishing is then performed on a tin disc using diamond abrasive grains having an average grain diameter $D_{50}$ of 0.5 μm to obtain a polished surface having an arithmetic mean roughness Ra of 0.2 μm or less in the roughness curve. The arithmetic mean roughness Ra of the polished surface is the same as that in the method described above.

The polished surface is observed at 200× magnification and, with an average area selected, an area of, for example, $7.2\times10^4$ $\mu m^2$ (horizontal length 310 μm by vertical length 233 μm) is captured with a CCD camera to obtain an observation image.

The distance between the centers of gravity of the closed pores can be determined for this observation image, for example, with the image analysis software "A zou-kun (ver 2.52)" (trade name of Asahi Kasei Engineering Corporation), using the method called a distance between centers of gravity method for dispersion measurement. Hereinafter, the term image analysis software "A zou-kun" refers to the image analysis software manufactured by Asahi Kasei Engineering Corporation throughout the description.

For example, the setting conditions for this method can be as follows: the threshold is 165 which is used as a measure of image brightness/darkness, the brightness level is set to dark, the small figure removal area is 1 $\mu m^2$, and no noise reduction filter is set. The threshold can be adjusted according to the brightness of the observation image. The brightness level is set to dark, the binarization method is set to manual, the small figure removal area is set to 1 $\mu m^2$, and the noise removal filter is set. Then, the threshold can be adjusted so that a marker appearing in the observation image matches the shape of the closed pore. For the equivalent circle diameter of the closed pores, a particle analysis method is used to determine the equivalent circle diameter of the closed pores by using the observation image as a target. The setting conditions for this method may be the same as the setting conditions for calculating the distance between the centers of gravity of the closed pores.

The skewness of the equivalent circle diameter and the distance between the centers of gravity of the closed pores can be calculated using the Skew function provided in Excel (trade name of Microsoft Corporation).

An example of a method for manufacturing a pipe made of such a ceramic is described. A pipe made of a ceramic containing aluminum oxide as the main constituent is described.

The main constituent of aluminum oxide powder (purity of at least 99.9 mass %) is put into a pulverizing mill with powders of magnesium hydroxide, silicon oxide, and calcium carbonate, and a solvent (for example, ion-exchanged water). The mixture is pulverized until an average grain diameter $D_{50}$ of the powders is 1.5 μm or less. Subsequently, an organic binder and a dispersing agent for dispersing the aluminum oxide powder are added and mixed to obtain a slurry.

Of the total of 100 mass % of the powders described above, the content of magnesium hydroxide powder is from 0.3 to 0.42 mass %, the content of silicon oxide powder is from 0.5 to 0.8 mass %, the content of calcium carbonate powder is from 0.06 to 0.1 mass %, and the remainder includes aluminum oxide powder and incidental impurities. The organic binder is, for example, an acrylic emulsion, polyvinyl alcohol, polyethylene glycol, polyethylene oxide, or the like.

Subsequently, the slurry is spray-granulated to obtain granules which are then pressurized at a molding pressure from 78 MPa to 118 MPa using a uniaxial press molding device or a cold isostatic press molding device to obtain a columnar powder compact.

The powder compact is cut, if necessary, to form a recess which becomes a recessed portion after firing.

A ceramic pipe composed of a ceramic is obtained by firing the powder compact at a firing temperature of from 1580° C. to 1780° C. and a retention time of 2 hours to 4 hours.

To obtain a ceramic having an interval between the closed pores of from 8 μm to 18 μm, the firing temperature is set to 1600° C. to 1760° C. and the retention time is set to 2 hours to 4 hours, for example.

The surface of the ceramic facing the flow channel may be ground to form a ground surface. A surface of the recessed portion on which the electrode is provided may be ground to form a bottom surface.

The inner diameter of the flow channel 5 is preferably at least 50 mm. In the void fraction sensor with the pair of electrodes provided on the outer circumferential surface of the pipe, the increase in the diameter of the pipe leads to an increase in the distance between the electrodes, causing a chance of a decrease in capacitance. However, as in the present embodiment, with the intermediate electrode 4, the distance between the electrodes decreases, causing an increase in capacitance and sensitivity. By providing the intermediate electrode 4, the inner diameter of the flow channel 5 can be increased, thus increasing the flow rate of the liquid hydrogen.

The inner diameter of the flow channel 5 is the maximum diameter of the flow channel 5 in a direction perpendicular to the intermediate electrode 4. That is, the inner diameter of the flow channel 5 includes the thickness of the intermediate electrode 4 and the thickness of the support 7 supporting the intermediate electrode 4.

As illustrated in FIG. 1, the pipe 2 includes recessed portions 6A and 6B formed at portions facing each other across the axial center of the flow channel 5, and the first electrode 3A and the second electrode 3B are disposed on the bottom surfaces of the recessed portions 6A and 6B, respectively. The recessed portions 6A and 6B and the first electrode 3A and the second electrode 3B may be provided over the entire length of the pipe 2 in the axial direction, or may be provided only in part thereof. The bottom surfaces of the recessed portions 6A and 6B are flat surfaces in FIG. 1, but may have an arc-shaped cross section corresponding to the flow channel 5.

The first electrode 3A and the second electrode 3B and the intermediate electrode 4 can be made of, for example, copper foil, aluminum foil, or the like. The first electrode 3A and the second electrode 3B can be provided on the bottom surfaces of the recessed portions 6A and 6B, respectively, by, for example, vacuum evaporation, metallization, or using an active metal method. Alternatively, the metal plates serving as the first electrode 3A and the second electrode 3B may be bonded to the bottom surfaces of the recessed portions 6A and 6B, respectively.

The intermediate electrode 4 is preferably disposed so as to connect two points on the inner peripheral surface, the two points facing each other in the radial direction of the flow channel 5. This allows division of the flow channel 5 for the liquid hydrogen, reducing the distance between the electrodes and increasing the capacitance. As a result, the sensitivity of the void fraction sensor 1 increases, thus improving the measurement accuracy of the void fraction of liquid hydrogen.

The pipe 2 includes a plate-like support 7 that supports the intermediate electrode 4 in the flow channel 5, and the intermediate electrode 4 is preferably incorporated in the support 7. Since the intermediate electrode 4 is supported by the support 7, the intermediate electrode 4 can be protected. In particular, the intermediate electrode 4 is less susceptible to damage, as it is not exposed in the flow channel 5, and can be used for a long period of time. The intermediate electrode 4 is arranged in parallel with the first electrode 3A and/or the second electrode 3B, for example.

An insulating ceramic similar to that of the pipe 2 can be used as the support 7. For this reason, the support 7 and the pipe 2 can be integrally formed by, for example, extrusion molding or cold isostatic pressing (CIP) molding. To incorporate the intermediate electrode 4 in the support 7, a film of the intermediate electrode 4, for example, can be inserted into a portion where the support 7 is formed during molding.

Instead of integral molding, the support 7 incorporating the intermediate electrode 4 may be formed in advance and then inserted into the flow channel 5 in a direction perpendicular to the axial direction.

Alternatively, the intermediate electrode 4 may be mounted (layered) on one surface or both surfaces of the support 7 so as to face one or both of the first electrode 3A and the second electrode 3B without incorporating the intermediate electrode 4. In that case, the intermediate electrode 4 can also be fabricated integrally, or may be bonded after integral molding.

The thickness of each of the first electrode 3A, the second electrode, 3B and the intermediate electrode 4 is at least 10 μm, preferably at least 20 μm, and 2 mm or less, and more preferably 1 mm or less.

The distance between the first electrode 3A and the intermediate electrode 4 is preferably electrically equal to the distance between the second electrode 3B and the intermediate electrode 4. By providing the electrically equal inter-electrode distances, the potential difference generated in accordance with the average thickness $t_{22}$ of a measurement space A is equal to the potential difference generated in accordance with the thickness $t_2$ of a measurement space B, which will be described later. Accordingly, the electrical evaluations of the void fraction for divided flow channels 5*a* and 5*b* can be treated equally, thus simplifying control. The meaning of "electrically equal inter-electrode distances" will be described later.

As illustrated in FIG. 1, the first electrode 3A and the second electrode 3B are electrically connected to the capacitance measuring device 8 to which the intermediate electrode 4 is also electrically connected, thus constituting the void fraction sensor 1.

Another embodiment of the present disclosure will be described with reference to FIG. 2. The same constituent members as those in FIG. 1 are denoted by the same reference signs, and the detailed description thereof will be omitted.

Figure 2:
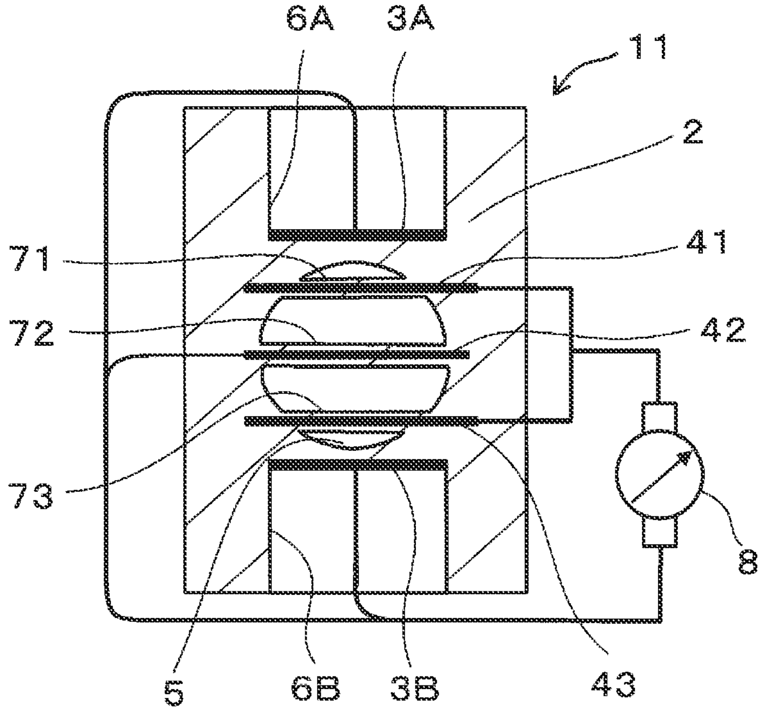
FIG. 2 is a schematic cross-sectional view illustrating a void fraction sensor according to another embodiment of the present disclosure.

As illustrated in FIG. 2, the void fraction sensor 11 according to the present embodiment includes a plurality of intermediate electrodes 41, 42, and 43, and the distances between each of the plurality of intermediate electrodes 41, 42, and 43 are electrically equal to each other. By providing the plurality of intermediate electrodes 41, 42, and 43, the distance between each of the plurality of intermediate electrodes 41, 42, and 43 can be decreased. This increases the capacitance accumulated between each of the plurality of intermediate electrodes 41, 42, and 43 and improves the measurement accuracy of the void fraction of the liquid hydrogen.

At this time, as long as the distances between each of the plurality of intermediate electrodes 41, 42, and 43 are electrically equal to each other, the distances can be appropriately changed to vary the sensitivity.

The intermediate electrodes 41, 42, and 43 are incorporated in and supported by supports 71, 72, and 73, respectively, as in the above-described embodiment. For example, the intermediate electrodes 41, 42, and 43 are disposed parallel to the first electrode 3A and/or the second electrode 3A 3B.

The first electrode 3A and the second electrode 3B and the intermediate electrodes 41, 42, and 43 are all electrically connected to the capacitance measuring device 8, and the capacitance measuring device 8 displays measured capacitance values.

When the gaseous hydrogen becomes a gas-liquid two-phase flow in which the gaseous hydrogen gathers in the vertically upper portion of the flow channel 5 of the pipe 2 depending on the conditions of use, the measurement accuracy of the whole measurement system can be improved by changing the weight of evaluation between the sensitivity in the vertically upper portion and the sensitivity in the vertically lower portion which mainly includes liquid.

To improve the measurement accuracy, the distance between the first electrode 3A and the intermediate electrode 41 closest to the first electrode 3A is preferably electrically equal to the distance between the second electrode 3B and the intermediate electrode 43 closest to the second electrode 3B.

Similarly, the distances between each of the plurality of intermediate electrodes 41, 42 and 43 are preferably electrically equal to the distance between the first electrode 3A and the intermediate electrode 41 closest to the first electrode 3A and/or the distance between the second electrode 3B and the intermediate electrode 43 closest to the second electrode 3B.

Figure 3A:
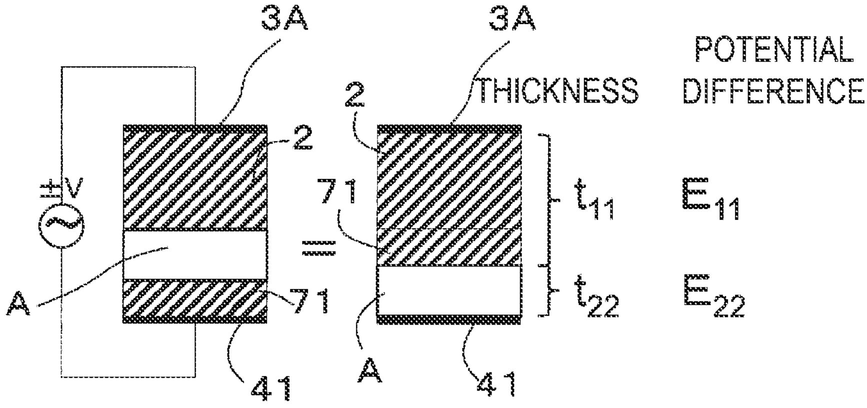
FIGS. 3A and 3B are schematic views for explaining that inter-electrode distances are electrically equal to each other.
Figure 3B:
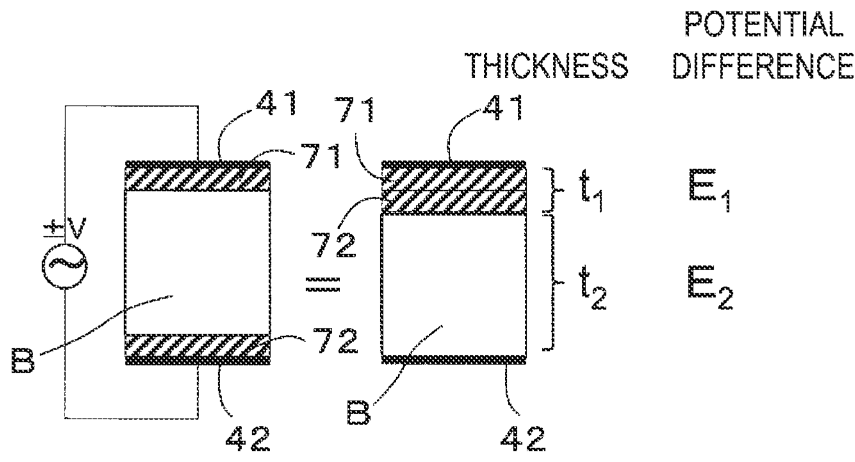

Here, the meaning of "electrically equal inter-electrode distances" is described by referring to the void fraction sensor 11 illustrated in FIG. 2. FIGS. 3A and 3B are schematic views illustrating the "electrically equal inter-electrode distances". FIG. 3A schematically illustrates a thick insulating layer that constitutes the pipe 2 between the first electrode 3A and the intermediate electrode 41. FIG. 3B schematically illustrates a thin insulating layer between the intermediate electrodes 41 and 42.

As illustrated in FIG. 3A, assume that a potential difference generated according to a total thickness $t_{11}$ of the average thickness of the pipe 2 sandwiched between the first electrode 3A and the intermediate electrode 41 and the thickness of the support 71 is defined as EH, and a potential difference generated according to the average thickness $t_{22}$ of the measurement space A sandwiched between the first electrode 3A and the intermediate electrode 41 is defined as $E_{22}$. On the other hand, as illustrated in FIG. 3B, assume that a potential difference generated due to a total thickness $t_1$ of the thicknesses of the supporting portions 71 and 72 sandwiched between the intermediate electrodes 41 and 42 is $E_1$, and a potential difference generated due to a thickness $t_2$ of the measurement space B sandwiched between the first electrode 3A and the intermediate electrode 41 is $E_2$. Then, $t_{11}$, $t_{22}$, $t_1$ and $t_2$ are adjusted to achieve $E_2=E_{22}$. This state is referred to as a state of electrically equal inter-electrode distances.

In the example illustrated in FIG. 2, since the total thickness $t_{11}$ of the insulating ceramic, which has a dielectric constant larger than that of the cryogenic liquid, is greater than the thickness $t_1$, the average thickness $t_{22}$ of the measurement space A is smaller than the thickness $t_2$ of the measurement space B.

The potential differences $E_1$, $E_{22}$, $E_1$, and $E_2$ can be measured by the capacitance measuring device 8.

The average thickness of the pipe 2 sandwiched between the first electrode 3A and the intermediate electrode 41 can be determined using the mean value theorem of integration. The average thickness $t_{22}$ of the measurement space A sandwiched between the first electrode 3A and the intermediate electrode 41 is a value obtained by subtracting the total thickness $t_{11}$, which is the sum of the average thickness of the pipe 2 sandwiched between the first electrode 3A and the intermediate electrode 41 and the thickness of the support 71, from the distance between the first electrode 3A and the intermediate electrode 41.

In addition to the void fraction sensors 1 and 11 of the above-described embodiments, the present disclosure may provide, as the void fraction sensor, a pair of electrodes for measuring capacitance composed of the first electrode 3A or the second electrode 3B disposed on the outer periphery of the pipe 2 and the intermediate electrode 4 disposed in the flow channel 5. That is, only one electrode 3A or 3B need be disposed on the outer periphery of the pipe 2. Such a pair of electrodes can also provide a short distance between the electrodes, increasing the capacitance accumulated between the electrodes and improving the measurement accuracy of the void fraction. Alternatively, two or more pairs of electrodes may be provided.

Alternatively, another void fraction sensor of the present disclosure may be the void fraction sensor including a pair of electrodes disposed in the flow channel 5 without using the first electrode 3A or the second electrode 3B disposed outside the flow channel 5. That is, the void fraction sensor may include, for example, the intermediate electrodes 41 and 43, the intermediate electrodes 41 and 42, or the intermediate electrodes 42 and 43 among the intermediate electrodes 41, 42 and 43 illustrated in FIG. 2. As illustrated in FIG. 2, each of the intermediate electrodes 41, 42, and 43 may partially be located inside the inner peripheral surface surrounding the flow channel 5.

The flowmeter according to the embodiments of the present disclosure is described. The flowmeter measures the flow rate of the liquid hydrogen flowing in the flow channel 5, and includes the void fraction sensor 1 or 11 and a flow velocity meter which is not illustrated for measuring the flow velocity of the cryogenic liquid flowing in the flow channel 5. The void fraction sensor 1 or 11 and the flow velocity meter are attached to a liquid hydrogen transfer pipe which is not illustrated (hereinafter may be referred to as a transfer pipe).

Since the liquid hydrogen flowing in the flow channel 5 is a gas-liquid mixed two-phase flow, the void fraction sensor 1 or 11 measures the capacitance of the liquid hydrogen, from which a density d ($kg/m^3$) of the liquid hydrogen is obtained.

Accordingly, a flow rate F (kg/s) is determined by the following equation, where v is the flow velocity (m/s) of the liquid hydrogen determined by the flow velocity meter, and a is the cross-sectional area ($m^2$) of the flow channel 5.

$$F = d \times v \times a$$

To calculate this equation, the flowmeter further includes a calculator to which the void fraction sensor 1 or 11 and the flow velocity meter are connected. This facilitates the measurement of the flow rate of the liquid hydrogen, leading to easier control when transferring a large amount of liquid hydrogen for industrial use.

The void fraction sensors 1 and 11 for liquid hydrogen and the flowmeter using the same have been described above, but the present disclosure can be similarly applied to other cryogenic liquids, such as liquid nitrogen (−196° C.), liquid helium (−269° C.), liquefied natural gas (−162° C.), liquid argon (−186° C.) and the like (where the values in parentheses indicate the liquefaction temperature). Therefore, the cryogenic liquid in the present disclosure is a liquid that is liquefied at a cryogenic temperature of −162° C. or lower.

Although the preferred embodiments of the present disclosure have been described above, the void fraction sensor of the present disclosure is not limited thereto, and various changes and improvements can be made within the range set forth in the present disclosure.

REFERENCE SIGNS

1, 11 Void fraction sensor
2 Pipe
3A First electrode
3B Second electrode
4, 41, 42, 43 Intermediate electrode
5 Flow channel
6A, 6B Recessed portion
7, 71, 72, 73 Support
8 Capacitance measuring device

The invention claimed is:

1. A void fraction sensor for measuring a void fraction of a cryogenic liquid, comprising:
a pipe having a flow channel in which a cryogenic liquid flows;
a first electrode and a second electrode disposed outside the flow channel;
at least one intermediate electrode disposed in the flow channel and between the first electrode and the second electrode, the at least one intermediate electrode configured to measure capacitance with at least one of the first electrode and the second electrode, wherein
the at least one intermediate electrode divides the flow channel is divided into at least two divided flow channels between the first electrode and the second electrode, and
the first electrode faces the at least one intermediate electrode via one of the divided flow channels and the second electrode faces the at least one intermediate electrode via another one of the divided flow channels.

2. The void fraction sensor according to claim 1, wherein
the at least one intermediate electrode is provided facing the first electrode and the second electrode along the axial direction of the flow channel.

3. The void fraction sensor according to claim 1, wherein
the at least one intermediate electrode connects two points on an inner peripheral surface, the two points facing each other in a radial direction in the flow channel.

4. The void fraction sensor according to claim 1, wherein
a distance between the first electrode and the at least one intermediate electrode is electrically equal to a distance between the second electrode and the at least one intermediate electrode.

5. The void fraction sensor according to claim 1, wherein
the at least one intermediate electrode comprises a plurality of intermediate electrodes, and distances between each of the plurality of intermediate electrodes are electrically equal to each other.

6. The void fraction sensor according to claim 5, wherein
a distance between the first electrode and the intermediate electrode of the plurality of intermediate electrodes closest to the first electrode is electrically equal to a distance between the second electrode and the intermediate electrode of the plurality of intermediate electrodes closest to the second electrode.

7. The void fraction sensor according to claim 5, wherein
the distances between each of the plurality of intermediate electrodes are electrically equal to at least one of the distance between the first electrode and the intermediate electrode of the plurality of intermediate electrodes closest to the first electrode and the distance between the second electrode and the intermediate electrode of the plurality of intermediate electrodes closest to the second electrode.

8. The void fraction sensor according to claim 1, wherein
the pipe comprises a support that supports the at least one intermediate electrode, and
the at least one intermediate electrode is incorporated in the support.

9. The void fraction sensor according to claim 1, wherein
the pipe comprises a support that supports the at least one intermediate electrode, and
the at least one intermediate electrode is mounted on one surface or both surfaces of the support to face one or both of the first electrode and the second electrode, and is covered with an insulating film.

10. The void fraction sensor according to claim 8, wherein the support is integrally formed with the pipe.

11. A void fraction sensor according to claim 1, wherein an inner diameter of the flow channel is at least 50 mm.

12. A flowmeter for measuring a flow rate of a cryogenic liquid flowing in a flow channel of a pipe, comprising:

the void fraction sensor according to claim 1; and a flow velocity meter configured to measure a flow velocity of the cryogenic liquid flowing in the flow channel.

13. A cryogenic liquid transfer pipe comprising:

the flowmeter according to claim 12.

* * * * *